(12) United States Patent
Moore (10) Patent No.: US 8,179,543 B2
(45) Date of Patent: May 15, 2012

(54) FINGERPRINT SCAN ORDER SEQUENCE TO CONFIGURE A PRINT SYSTEM DEVICE

(75) Inventor: John A. Moore, Rochester, NY (US)

(73) Assignee: Xerox Corporation, Norwalk, CT (US)

( * ) Notice: Subject to any disclaimer, the term of this patent is extended or adjusted under 35 U.S.C. 154(b) by 551 days.

(21) Appl. No.: 12/184,289

(22) Filed: Aug. 1, 2008

(65) Prior Publication Data

US 2010/0027045 A1 Feb. 4, 2010

(51) Int. Cl.
G06K 15/00 (2006.01)
G06K 9/00 (2006.01)
G06F 21/00 (2006.01)
G06F 11/30 (2006.01)
H04N 7/16 (2011.01)

(52) U.S. Cl. ....... 358/1.14; 382/124; 713/186; 713/193; 726/28

(58) Field of Classification Search ............... 726/28; 382/124; 358/1.14; 713/186, 193
See application file for complete search history.

(56) References Cited

U.S. PATENT DOCUMENTS

| | | | |
|---|---|---|---|
| 5,719,950 A | 2/1998 | Osten et al. | |
| 6,193,153 B1 | 2/2001 | Lambert | |
| 6,272,562 B1 | 8/2001 | Scott et al. | |
| 6,393,139 B1 | 5/2002 | Lin et al. | |
| 6,400,836 B2 | 6/2002 | Senior | |
| 6,654,484 B2 | 11/2003 | Topping | |
| 7,020,270 B1 | 3/2006 | Ghassabian | |
| 7,039,223 B2 | 5/2006 | Wong | |
| 7,272,247 B2 | 9/2007 | Hamid | |
| 7,308,122 B2 | 12/2007 | McClurg et al. | |
| 7,310,133 B2 | 12/2007 | Nagasaka et al. | |
| 7,382,904 B2 | 6/2008 | Lee | |
| 2005/0273865 A1* | 12/2005 | Slijp et al. | 726/28 |
| 2007/0041622 A1* | 2/2007 | Salva Calcagno | 382/124 |

\* cited by examiner

Primary Examiner — Charlotte M Baker
Assistant Examiner — Justin Katzwhite
(74) Attorney, Agent, or Firm — Philip E. Blair; Fleit Gibbons Gutman Bongini & Bianco P.L.

(57) ABSTRACT

What is disclosed is a system and method for capturing fingerprint data in an ordered sequence and using the captured sequence to configure a complex multi-function print system device to a set of device specific settings to perform intended workflow processes. Each finger has a unique associated code. A code sequence is associated with each stored set of settings. A user desiring to configure the device scans their fingerprints in a predefined ordered sequence. Settings associated with the entered sequence are retrieved and displayed for user approval. Thereafter, the complex print system device can be easily configured to the displayed settings. Other embodiments are additionally disclosed.

13 Claims, 8 Drawing Sheets

FINGERPRINT SCAN ORDER SEQUENCE TO CONFIGURE A PRINT SYSTEM DEVICE

TECHNICAL FIELD

The present invention is directed to systems and methods for capturing fingerprint data in an ordered sequence and using the captured sequence to configure a complex print system device to a set of device specific settings to perform a desired workflow process.

BACKGROUND

A biometric is a unique, measurable characteristic or trait of a human being for automatically recognizing or verifying identity. Biometric capture is a term used that generally refers to the sensing and conveyance of physical attributes of a user including finger prints, palm prints, voice prints, retinal patterns, facial orientations, body temperature, and the like. Biometric devices have been used for user identification in security systems to enable system access.

Fingerprints are one example of a biometric which can be readily captured. Fingerprint identification (sometimes referred to as dactyloscopy) is the process of comparing known friction skin ridge impressions (minutia) from fingers (or palms) to determine if the impressions are from the same finger or palm of a known print. The flexibility of friction ridge skin means that no two finger or palm prints are ever exactly alike (never identical in every detail of minutia). A known print is the intentional recording of the friction ridges of the fingers and/or palm, usually with black ink rolled across a contrasting white background such as a white fingerprint card. Fingerprints can also be recorded digitally using any of a wide array of fingerprint scanning devices presently available in commerce. Fingerprint scanning devices have been used for identification, authentication and verification purposes.

Many high-end multi-function document reproduction systems known in the arts are capable of performing complex functions which may require extended operator training. In a print job or copy job document reproduction environment, device operators must program the complex system to perform specialized tasks required for a quality result of a customer's print/copy job. Such complex print devices are capable of perform a plurality of diverse workflows. The availability of complex printing systems has greatly expanded the number of paper media types that may be specified for a particular print job depending on print engine characteristics and the output quality desired. In order to accommodate the proliferation of print media types, complex printing systems need to be specifically configured and reconfigured to the desired set of device specific settings optimized for a particular print media type and workflow process. In order to consistently provide an optimal work product, device operators of such complex document reproduction systems must manually program the print system to handle different print media stocks to meet customer job requirements. This often is a time consuming process during which the document system is not running at capacity. This is particularly a problem in busy document reproduction print/copy job environments where the number of jobs desired to be performed in a single day is large.

In many of today's print engines, information regarding various complex device specific settings required for certain print media attributes is entered manually when an operator desires to run a new print job requiring a new print media. Manual entry for complex settings can be time consuming. It may be difficult to ensure that the configuration settings were entered correctly. An incorrect system setting may not even be noticeable until a large volume of the print job has already been run. Further, it may be difficult to determine whether the existing system settings optimized for a specific set of print media attributes is current or has been updated in a timely manner as more optimal and new configuration settings became available. Furthermore, complex internal components running at very high throughput rates using configuration settings not optimized for a particular media may lead to excessive device component wear, breakdown, and ultimately a system failure. Thus it is important to be able to quickly, easily, and properly configure a complex print system device to a set of device specific system settings which have been optimized for various print media types and various workflow processes.

Since such complex print systems are capable of performing different workflows, regular users thereof often need to reprogram the print device to perform their particular workflow each time they approach the device. Such users may not be properly trained and may not readily understand the inherent complexities of the print system settings. Further, certain workflow processes may be common to a particular group of users who normally perform the same kinds of document reproduction functions. Other workflows may be tailored to a specific type of user whose job function requires them to configure the print device to perform another entirely different function. In some print/copy job environments, it may further be desirable to prevent certain users from configuring the system to perform particular workflows or prevent them from configuring a device without authorization.

Accordingly, what is needed in this art are increasingly sophisticated systems and methods which utilizes a fingerprint scanner to quickly and easily configure a complex document reproduction device to a set of custom settings and defined workflow processes using a sequence of fingerprint scans.

BRIEF SUMMARY

What is provided is a novel system, method, and computer program product for capturing fingerprints in an ordered sequence and using the captured sequence to configure a complex multi-function print system device to a set of device specific settings and initiate workflow processes desired to be performed on the print system by a user thereof. Through an implementation of the present system and method, complex print system devices can be quickly and easily configured to custom device specific settings and workflows through a simple swiping of a user's fingers in a defined sequence.

In one example embodiment, the present method for configuring a print system device to a set of device specific settings involves first scanning a plurality of individual fingerprints wherein each fingerprint has been is associated with a predetermined alphanumeric code. From the order in which the fingerprints were scanned, a code sequence is built from the ordered sequence. The code sequence is then used to index and retrieve a set of device specific settings which have been previously associated with the specific code sequence obtained from the sequence of fingerprint scans. The matching device specific settings are retrieved and displayed for the user. In response to a user acceptance of the displayed settings, the device is then configured according to those settings. If no stored device specific settings are found to match the determined code sequence, then a default set of settings is displayed for the user. The user can edit/modify any of the displayed settings to their own parameters, and can further enter their own sequence of fingerprint scans that they wish to be associated with their own set of custom settings. The entered code sequence is then associated with the user's custom settings and stored for subsequent retrieval. Users who wish to configure the print device to the previously stored device specific settings merely have to swipe their fingers on the fingerprint scanning device in the appropriate scan order sequence. In such a manner, complex print system device settings can be quickly retrieved, displayed, and configured while maintaining security since only users who know the correct scan order sequence will be able to access those settings.

A system is also provided herein. The system provides for the automatic retrieval and configuration of a print system device to a set of device specific settings. In one embodiment, the system comprises a communication network for transmitting data between networked devices. The print system device is in communication with the network and includes a device controller for configuring the print system to a predetermined set of device specific settings. A database is also provided which is capable of storing, indexing, and retrieving stored data records from a storage medium. The database is in communication with the network. A processor capable of executing machine readable instructions is in communication with the database and the system device. A fingerprint scanning device is communication with the processor and provides the processor with a digital representation of each of the scanned individual fingerprints. The processor executes machine readable instructions. The instructions include the following steps. A user approaches the system device and places a first finger on the fingerprint scanning device. The user then places a second finger on the scanning device and repeats the process until all the fingers have been scanned in the appropriate scan order. The process then associates an alphanumeric code with each of the scanned fingers to build a code sequence. The database is indexed and queried for records which have already been associated with the particular fingerprint scan code sequence entered. If a matching record is found, it is retrieved and displayed on a user interface display for user acceptance. The user can also modify the settings. Once accepted, the device is automatically configured to the currently displayed device specific settings. On the other hand, if no records have been found which match the fingerprint scan sequence entered by the user, then a default set of settings is displayed. The user can then modify the settings according to their own job requirements. The user can further associate their own fingerprint scan sequence with their own displayed customized settings. The entered code sequence is then associated with the displayed custom settings and stored. Thereafter, the user merely has to approach the print system device, swipe the individual fingers on the fingerprint scanner in the defined order sequence and the associated device specific settings are automatically retrieved. The device can thereafter be quickly and easily configured to the predetermined set of user-specified settings. The present method is readily extendible to workflow processes and other system specific configuration settings. Other features and variations are provided herein.

The foregoing and other features and advantages will be apparent from the following more particular description of the various embodiments of the invention, as illustrated in the accompanying drawings.

BRIEF DESCRIPTION OF THE DRAWINGS

The foregoing and other features and advantages of the subject matter disclosed herein will be made apparent from the following detailed description taken in conjunction with the accompanying drawings, in which.

DETAILED DESCRIPTION

What is disclosed herein is a novel system and method for capturing fingerprint data in an ordered sequence and using the captured sequence to configure a complex multi-function print system device to a set of device specific settings. Through an implementation hereof, a complex print device can be quickly and easily configured to set of custom settings and desired workflows through a series of fingerprint scans performed in a predefined ordered sequence.

It should be understood that one of ordinary skill in this art would be readily familiar with many facets of print systems common to print/copy job environments and device specific settings common to those print system. One of ordinary skill would also be knowledgeable about computer science, databases, and software and programming systems and methods sufficient to implement the functionality and capabilities described herein in their own print system device environments without undue experimentation.

The set of complex print system devices generally known in digital document reproduction environments to which the present system and method will likely find its intended uses encompasses any document reproduction apparatus including digital copiers, bookmaking machines, facsimile devices, xerographic or other multi-function image reproduction devices capable of performing a print/copy job operation. Such complex print system devices generally include a user interface such as a CRT or touchscreen display and generally further include any number of data entry interfaces such as a keyboard, mouse, keypad, and the like. Such systems have complex paper transport mechanism, collators, sorters, staplers, to name a few, each controlled by device specific controllers many of which are configurable to one or more device specific settings.

Document reproduction devices generally include a plurality of paper trays capable of retaining a variety of print media/stock. Media refers to a set of attributes which includes color, weight, thickness, coating options, finish, white point, etc. Stock refers to a specific instance of a media and includes such media attributes as size, grain direction, drilled, type, ordered stock modulus, etc. A single media can have many stocks associated with it but any given stock belongs to a single media. In addition to those attributes relating to the physical substrate, media also includes data on how stocks are to be processed by the print engine.

The term "device specific setting" or "configuration settings" or "system setting" refers to any system or subsystem setting applicable to a print system device which are used by the print engine to optimize performance. The term also is intended to refer to workflow processes which the print system device can be programmed to perform. Device specific settings include, for example, settings for sheet steering for registration control where media thickness and weight and stock size are important parameters. Subsystem settings include, for example, fuser temperatures which are generally based on media type, thickness, and weight, and are selected for optimal quality, throughput, and performance. Other subsystem settings are discretely set per paper stock and are not derived from the selected media attributes. Such settings would be, for example, ATA tip velocity control, transfer dicor control, and pre-transfer dicor control. In these cases, the subsystem critical parameter settings, in the form of a voltage levels are provided as part of the paper stock description obtained from the user selected print media attributes. In some cases a separate critical parameter setting is provided for side 1 and side 2 of the paper stock.

Various types of print media (i.e. paper, forms, cards, transparencies, etc.) can be defined by a set of print media attributes which includes type, size, color, weight, etc. A print media "type" attribute includes: plain, lightweight, recycled, Mylar, etc. A print media "size" attribute includes: letter, legal, executive, A4, A5, A6, etc. A print media "color" attribute can be any of: blue, green, etc. Values such as: lb, gsm, etc., are associated with a print media "weight" attribute. For example, A4 paper has the following print media attributes: type-plain, size-21.0×29.7, color-white, weight-90. Accordingly, print media attributes encompasses the set of characteristics by which differing types of print media used in a document reproduction system can be differentiated.

The present system and method utilizes a fingerprint scanning device to obtain a series of fingerprint scans. The obtained sequence of the individual fingers scanned is referred to herein as the "ordered sequence" or "scan sequence". The ordered sequence is then used to search a set of stored device specific settings. The set of device specific settings which has already been associated with that particular finger scan sequence is retrieved. The retrieved settings are displayed for user modification and acceptance. The user can thereafter configure the print system device to the retrieved settings and initiate the desired workflow.

Figure 9:
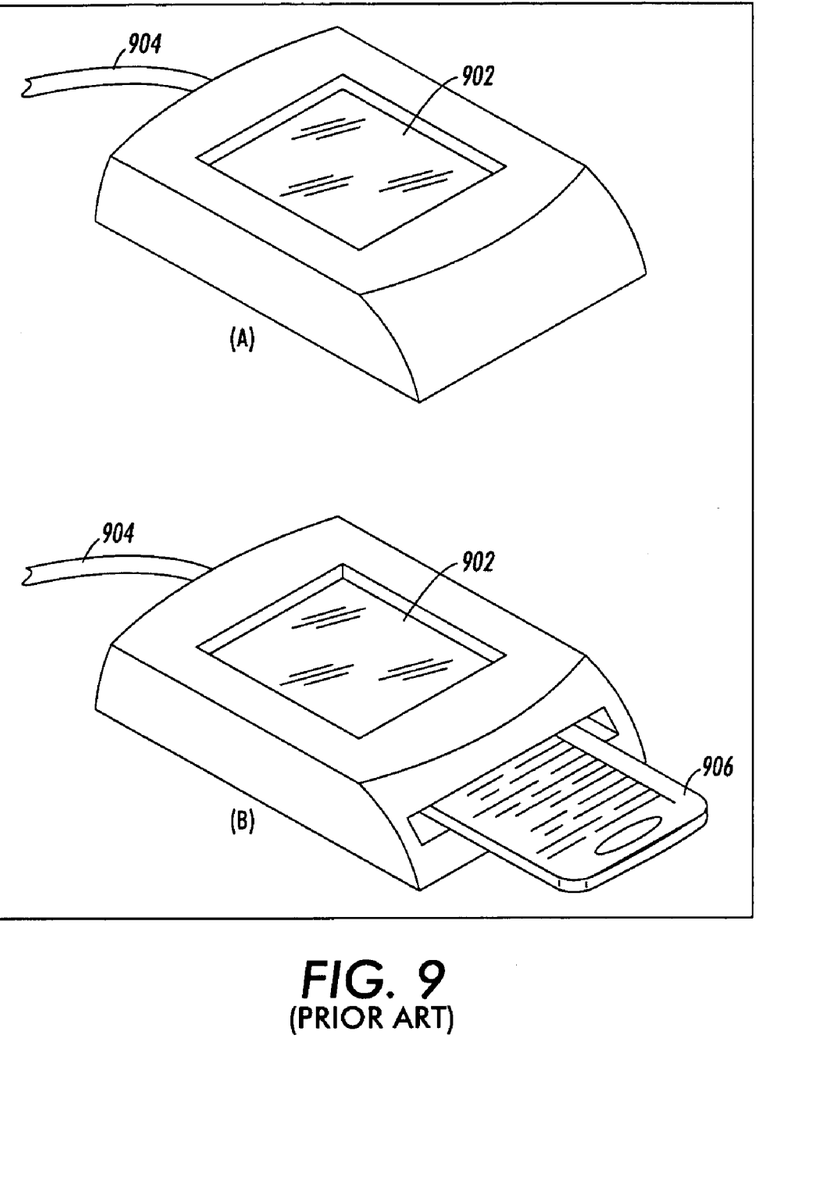
FIG. 9 illustrates two embodiments of different fingerprint scanning devices known in the art.

Reference is now being made to prior art FIG. 9 which illustrates two embodiments of fingerprint scanning devices known in the art. In the embodiment of FIG. 9A, a finger to be scanned is placed onto scan surface 902. Pressure sensors within the device are used to detect finger contact with the scan surface. Pressure sensitive fingerprint scanners are known (see: U.S. Pat. No. 7,272,247 and the art cited therein). The fingerprint is scanned to produce a digital or analog signal. The obtained signal is then sent to the host device via cable 904. The embodiment of FIG. 9B is the same as that described with respect to FIG. 9A but additionally incorporates a smartcard reader also known in the arts. The user swipes card 906 having a magnetic strip for additional authorization or identification. One such card would be, for example, an employee badge. In a like manner, the obtained scan signal is sent to the host device via cable 904. It should be understood that this art is replete with a wide variety of fingerprint scanning devices which include palm scanners, whole hand scanners, and other biometric scanning devices such as retinal scanners, and the like. Specialized software executed by a processor in the host device interprets the received signal into a digital representation of the scanned fingerprint for finger identification. Software and hardware devices known in the arts are capable of identifying the individual finger scanned and the associated hand. One example device is disclosed in U.S. Pat. No. 7,310,133 which is incorporated herein in its entirety by reference.

Alternatively, fingers of a respective hand can be identified through a registration process. In such a process, individual fingers are scanned (registered) in a defined order and the specific fingers identified by that order. Individual fingers can be manually identified in a registration process. Once registered, a user's individual scanned fingerprints are compared to stored prints which have already been registered in order to find a match. The found matching print is used to identify the particular finger just scanned. It is well known in this art to electronically compare digitized finger prints from a set of prints stored in a database. As discussed in the background section hereof, fingerprints are generally matched by friction skin ridge impressions and other minutia. It should be appreciated that, in the absence of an implementation of a more sophisticated system capable of automatically identifying a particular finger of a hand particular hand from a fingerprint scan without having gone through a registration process, the present system and method will be restricted to the set of users whose individual fingers have been registered. The present system can be implemented using multiple fingerprint scanning devices (one for each finger of each hand) and each finger/hand combination can be readily identified by its placement on the particular scanning device. A template can also be implemented which is tailored to the shape of a left hand and a right hand and the individual finger scans can be readily identified by their proper placement in the template.

Figure 1:
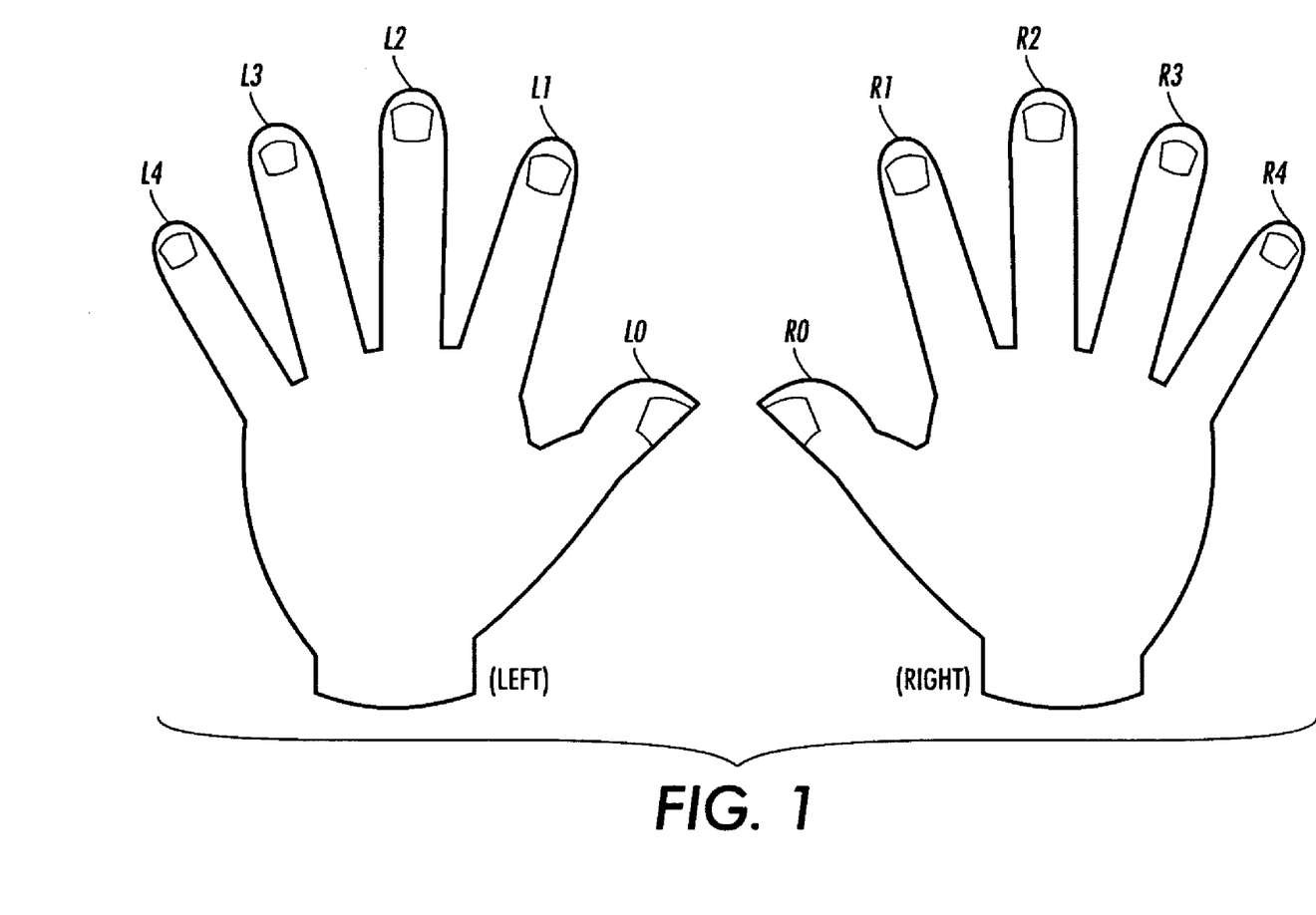
FIG. 1 are views of a left and right human hand with indications of one embodiment of alphanumeric codes assigned to individual fingers.

An implementation of the present method requires that a unique code be assigned to each of finger. In one example, the registration process assigns alphanumeric codes as shown in FIG. 1 wherein the fingers of the left hand are assigned the letter "L" and the fingers of the right hand are assigned the letter "R". The individual fingers are assigned a numeric value which identifies the particular finger. In the example illustrated, each finger is assigned a number between 0-4 with zero being associated with the thumb and four being associated with the little "pinky" finger. Thus, for example, the thumb of the left hand is assigned the code "L0" for "left thumb" and the index finger of the right hand is assigned the code R1 for "right index", and so on. The various uses of the alphanumeric codes of FIG. 1 will become more readily apparent from the following detailed discussion.

Figure 2:
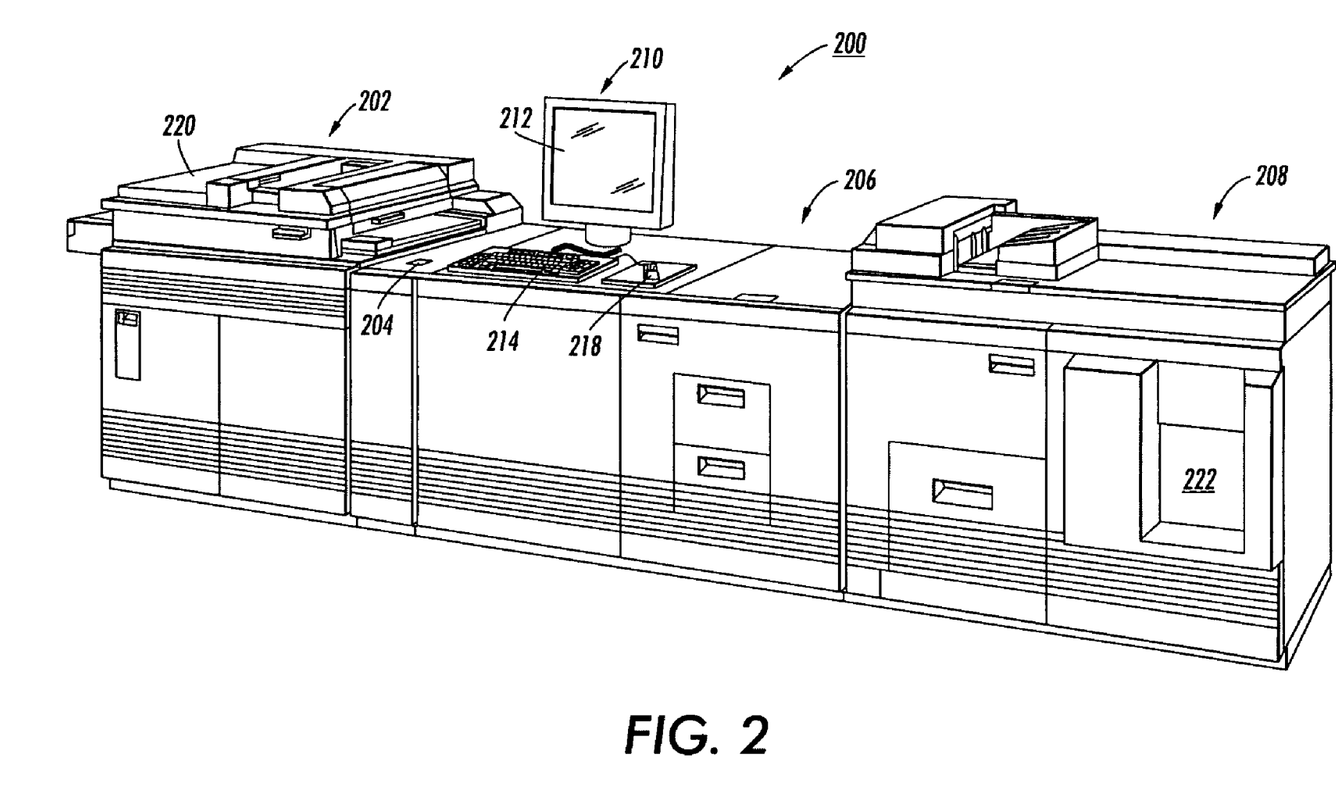
FIG. 2 illustrates one example embodiment of a complex document reproduction system wherein a fingerprint scanning device and various embodiments hereof have been incorporated.

Reference is now being made to FIG. 2 which illustrates one example complex print system device 200 wherein a fingerprint scanning device and various embodiments hereof have been incorporated.

Print system 200 generally includes an input module 202, a document processing module 206, and a printer module 208. Input module 202 includes a document scanning device 220 and a tray for the placement of documents desired to be input into the system. The document processing module include device controllers which govern the performance of many of the document processing functions. Printer module 208 also includes device controllers for regulating the application of inks or toners onto the selected media as well as the control of various selected media attributes moving through the print system for proper registration, and the like. Document reproduction system 200 includes one or more discharge areas 222 where finished documents are deposited. It should be appreciated that many device specific settings are configurable on a document reproduction device as complex as the system of FIG. 2.

Document processing workstation 210 incorporates a variety of input devices including a display 212, and a keyboard 214 and mouse 218. The keyboard and mouse provide input methods which enable the device operator to enter, or select options. Alternatively, a touchscreen display is provided. Document processing workstation 210 is used by an operator to select print media attributes, configure device specific parameters, initiate scan operations, and the like, and to enable the device operator to set document processing workflow processes.

The document processing station internally comprises a special purpose computer system which has a processor capable of executing machine readable instructions, memory and a storage device, such as a disk drive, for storing programs and data. It should be understood that workstation 210 necessarily includes machine executable instructions for displaying the print media attributes and for communicating with various internal device controllers which, in turn, configure the print system device to the user-selected settings desired for the intended workflow. System settings are stored in a memory unit or storage device accessible by a processor of the special purpose computer. Some settings may be locked-out or restricted from being selected or changed by someone other than a technician.

Fingerprint scanner 204 is fixed to or integrated with document reproduction system 200 and placed near workstation 210 for convenient operator/user access. The fingerprint scanner is internally interfaced with the special purpose computer system configured to receive digital signals from the fingerprint scanning device. The special purpose computer can be configured to identify the finger/hand combination of the scanned input, match and retrieve system settings, and execute software designed to perform other functions described herein. One example embodiment of a special purpose computer is more fully described with respect to FIG. 7.

One skilled in this art would appreciate that various internal components of a complex document reproduction device, such as print system device 200, are controlled by internal device controllers and are changeable based upon the selected print media attributes chosen for a particular print/copy job. Such device controllers configure internal pathways to, for example, transport a certain type of print media having a particular size or orientation. Other internal components can be configured by device controllers to adjust the amount of toner to be applied to a print media surface. Device controllers instruct other components to change, for example, the temperature at which a toner is fused to a surface of a particular print media type. Sophisticated complex print systems, such as that illustrated in FIG. 2, have many such internal components capable of being configured by device controllers to one or more system settings selected by a user/operator. Such complex print system devices require operator training such that the device can be properly configured for a set of print media attributes to maintain a quality output. Thus it should be appreciated that, in such devices, the operator is trained on how to change various system configuration settings through the workstation's user interface to ensure optimal device performance, throughput, and job quality for a set of selected print media attributes desired for a particular workflow process.

Figure 3:
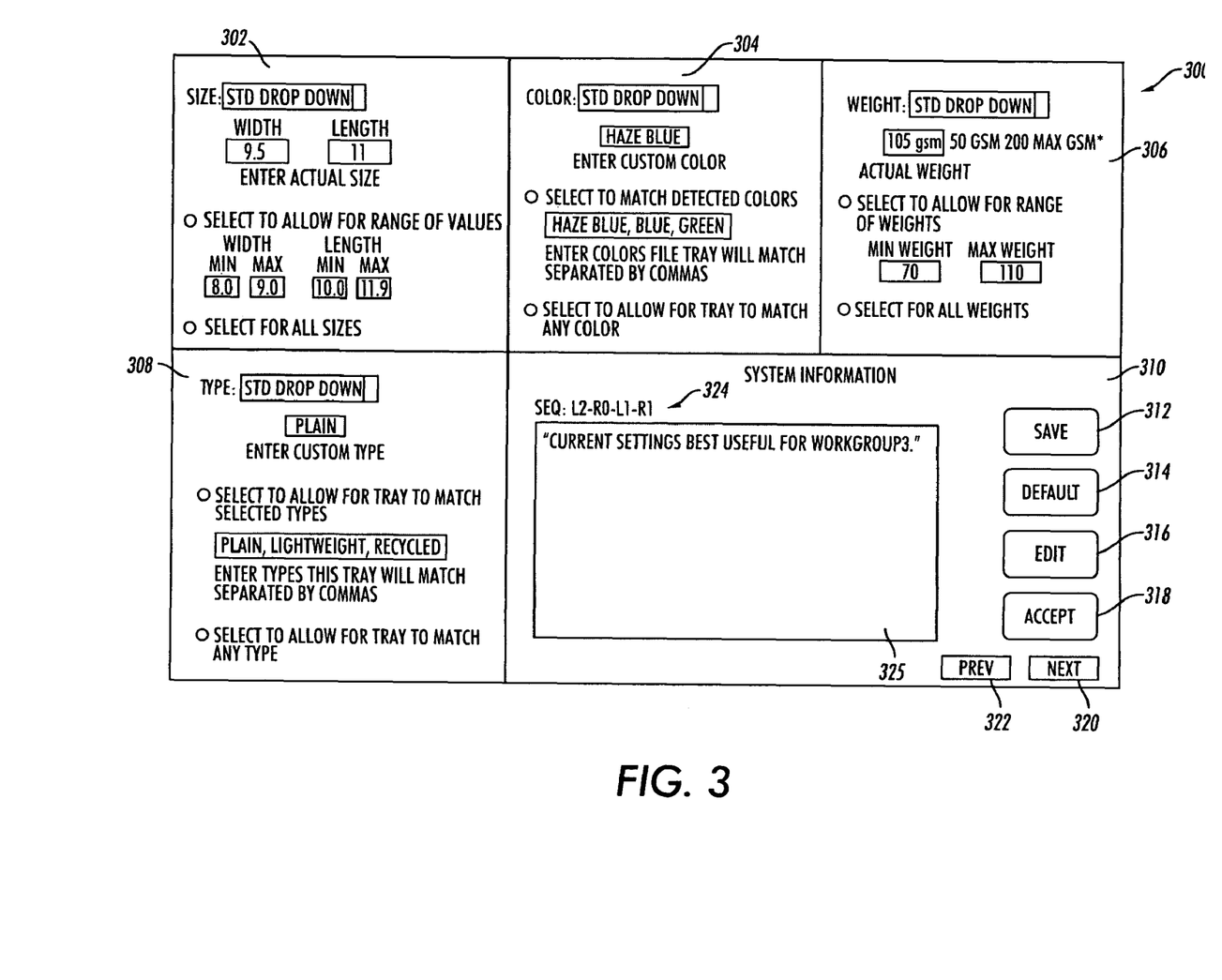
FIG. 3 illustrates a topside view of an example touch screen that would appear to an operator via the user interface for operator entry of attributes of a particular print media loaded in the paper trays of a document reproduction system.

Reference is now being made to FIG. 3 which illustrates one embodiment of a view of display 300 showing an operator print media attributes of paper/stock retained in the paper trays 222 of print system device 200. The operator modifies the displayed settings via the keyboard 214 and mouse 218 of workstation 210.

Various screen portions of the workstation display of print system device 200 showing a set of user selectable print media attributes in accordance with the embodiments hereof will now be described in greater detail. It should be understood that the embodiment shown and described regarding the displayed portions of the workstation display are illustrative and are not intended to be limiting. Other variations and arrangements and options provided the operator on the display screen will vary depending on the complexity of the print system device, the types and amounts of different setting combinations, selectable options, and the intended uses thereof.

Display portion 302 enables the operator to program values for print media size. If the print media has a standard size, the operator may actuate a drop down menu containing a list of print media sizes and select the size for the media loaded in the paper tray. A wildcard option allows any print media presently retained in a particular paper tray to be used for the print job no matter what paper was specified. As a quality control check, a controller insures that the attributes sensed by paper tray sensors for the media loaded in the paper tray fall within acceptable parameters. Display portion 304 enables the operator to program values for print media color. If the print media has a standard color, the operator may actuate a drop down menu containing a list of standard colors and select the appropriate color for the print media loaded in the paper tray, or enter a value for color. Display portion 306 enables the operator to program values for print media weight. If the print media has a standard weight, the operator may actuate a drop down menu containing a list of standard weights and select the weight for the print media loaded in the paper tray. Screen portion 308 enables the operator to program values for print media type. If the print media has a standard type, the operator may actuate a drop down menu containing a list of standard types and select the type for the print media loaded in the paper tray.

Display portion 310 includes a text area 325 for displaying lines of text messages associated with the currently displayed print media attributes. Such a section provides an area for the presentation to the operator of information stored with the attributes currently displayed. Text messages may, for instance, alert the operator to nuances in any of the displayed settings or provide additional insight that the operator may wish to consider when configuring the device for a certain workflow process. The operator can scroll through the messages using the NEXT 320 and PREV 322 buttons. It should be clear that the information displayed in FIG. 3 represents only a single screen worth of print media attributes. The NEXT and PREV buttons are used by the user/operator to bring up other screens containing additional print media attributes. The user/operator can scroll through a plurality of such screens. Additional screens will contain other selectable device specific settings. Other screens will include user selectable workflow process settings such as double-sided, collate, staple, and the like. An entire set of customized settings are intended to be associated with the code sequence, as described herein further, and collectively stored/retrieved in accordance with the teachings hereof.

Display portion 310 further includes a SAVE 312, a DEFAULT 314, an EDIT 316, and an ACCEPT 318 button. The operator may elect to edit any of the displayed settings by pressing EDIT and hitting, for example, the TAB key to jump over to the appropriate displayed setting. The operator would modify the setting to the desired value. The ACCEPT 318 button is used if the operator is satisfied with the system settings. If, on the other hand, the operator was not satisfied with the currently displayed settings or with the information contained in one of the displayed windows, he or she would press the DEFAULT 314 button and the system would retrieve and display a set of default settings for the current window. An ESC option, for example, would load the defaults for all window screens. A default scan sequence such as, for instance, R0-R0, can be associated with the default settings. The SAVE 312 button is provided to enable a user/operator to save the current settings to a storage device.

Also shown in display portion 310 is the fingerprint scan sequence 324 which has been associated with the current set of custom settings. In accordance herewith, when the user/operator has selected a set of settings, a fingerprint scan sequence is then associated with those settings. The fingerprint sequence which is associated with the currently displayed custom settings is "L2-R0-L1-R1". Referring back to the alphanumeric code associated each of the fingers of FIG. 1, this sequence corresponds to the finger sequence: left middle finger (L2), right thumb (R0), left index finger (L1), and right index finger (R1). It should be appreciated that more complex finger scan sequences would be associated with more specialized settings that may be restricted to certain operators or technicians, or to certain workgroups of employees. Other finger scan sequences could be used to display diagnostic information on the display. For example, the finger scan sequence R0, R0, R0, L0, corresponding to right thumb, right thumb, right thumb, left thumb, could be used by service technicians to display a set of system specific diagnostic settings or to perform a diagnostic function. Another sequence could be used by management to query various device parameters such as, for example, the amount of stock used, paper count, downtime, service history, and the like.

The stored settings are retrieved and automatically displayed by the user/operator scanning the appropriate finger sequence utilizing fingerprint scanning device 204 shown with system 200 of FIG. 2. If there presently is no fingerprint scan sequence associated with the currently displayed settings then the user/operator would manually enter the desired scan sequence using keyboard 214. Once the entire desired sequence is displayed and the operator is satisfied, he or she would press the SAVE 312 button. The entered scan sequence, once accepted by the operator, is stored in the database with the record containing the current customized settings and will be displayed in sequence area 324 whenever the current customized settings are displayed. Placement of the appropriate finger on the fingerprint scanning device 204 in the desired sequence retrieves the associated settings and displays them for the user. The user hitting the ACCEPT button 318 would cause the special purpose computer to being the process of configuring the print system device to the current settings. The special purpose controller would interpret the system settings and signal the various device controllers to make the necessary subsystem adjustments according to the selected print media attributes and the desired workflow intended to be performed.

Device controllers are further capable of determining whether any of the paper trays contain print media having the desired media attributes entered. If one of the paper trays contains such print media, the appropriate subsystem would begin feeding the desired print media from the appropriate tray at the start of the print/copy job. If none of the trays contained the desired print media having the specified ranges of values for the selected attributes, the device controller would have to then determine whether any of the paper trays contained print media having wild card ranges for attributes sufficient for that job. If one of the paper trays contained such print media, the device controller would signal the appropriate subsystem to begin feeding from that tray. If none of the trays contained print media adequate for the intended workflow, the printer control system would notify the user/operator that the current print job cannot proceed as configured and provide an appropriate message as to the reasons why the job has failed.

Additionally, an indication is provided either a notification on correcting the current problem. Such notification may include an alarm sound and/or a message displayed on the user interface. In the event that more than one tray contains print media having the exact attributes required by the print job, more than one tray contains print media having specified ranges of values for the print media attributes that include the attributes required by the print job, or more than one tray contains print media having wild card ranges for the print media attributes that include the attributes required by the print job, the printer control system will determine which of the trays meeting the attribute criteria is highest in a default tray ranking and feed the media from that tray.

It should be understood that the workstation has specialized software configured to display a wide variety of numeric values, text, scroll bars, dials, slideable bars, pull-down menus, selectable buttons, and the like, for entering, selecting, modifying, accepting any of the displayed information. The embodiment shown is only illustrative and may include any other functionality which any display device known in the arts is capable of displaying. The screen display 300 merely illustrates one example embodiment. Software to configure a user interface or any portion thereof to display/enter/accept data is highly customizable and may be device dependent. Such software is usually considered proprietary. Therefore, a further discussion regarding specific programming techniques and software algorithms to program or otherwise configure a display device to display a certain set of settings is omitted herein. One of ordinary skill would program their display portions for a specific system in a particular print/copy job environment.

Figure 4:
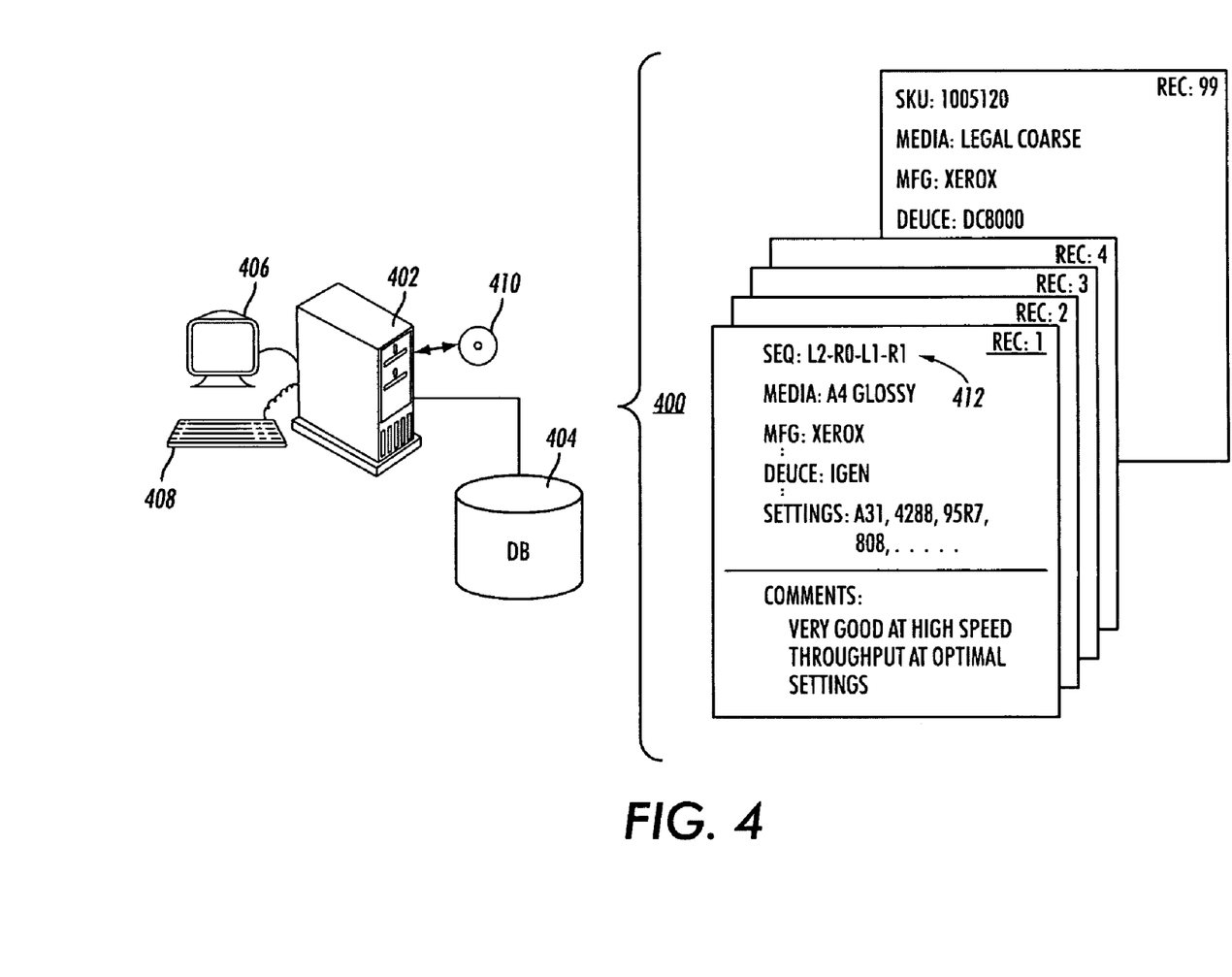
FIG. 4 illustrates a plurality of indexed retrievable records stored in a database in communication with a general purpose computer system.

Reference is now being made to FIG. 4 which illustrates a plurality of records 400 which have been sent to computer system 402 for storage in database 404. The computer system incorporates a display 406 such as a CRT or LCD, a keyboard 408, and a computer readable medium 410 containing machine readable and machine executable program instructions for performing one or more aspects of the present method. The computer readable medium can also be used to store, transfer, and retrieve records. Shown stored with the first record is the fingerprint scan sequence 412. This is the same code sequence displayed in text area 324 which a user/operator has previously associated with the current set of customized device specific settings. The information contained in any of the records shown in FIG. 4 is illustrative. Codes such as: A31, 42BB, 95R7, and B08 of record 001 are intended to represent coded device settings which a device controller would use to configure subsystems. Strings can be easily associated with these codes such that the appropriate values are displayed for the operator on the display in the appropriate language on any of the display portions. Converting the settings to codes prior to storage helps minimize the amount of storage space required to save all the values of all the window screens which are saved by a user for a particular customized workflow process.

The computer system 402 includes a communications interface (not shown) which effectuates the transfer of data to external devices (such as system 200 of FIG. 2). Examples of a communications interface include a modem, a network interface (such as an Ethernet card), a communications port, a PCMCIA slot and card, etc. Print system device 200 may be networked to computer system 402 and database 404. Computer 402 may be placed in communication with any number of document reproduction systems by way of a connection to the internet. Many aspects of the internet are commonly known. A further discussion as to the construction and/or operation of the internet itself has been omitted herein. Suffice it to say, data is transmitted in packets by a network of servers connected via a plurality of communication links. One device with open access to the internet can communicate with another device with open access to the internet through such data packets using established protocols. Data is transferred via the internet in the form of signals which may be, for example, electronic, electromagnetic, optical, or other signals. These signals are provided to a communications device such as a network server, which transmits and receives data packets by means of wire, cable, fiber optic, phone line, cellular link, RF, satellite, or any other medium or communications link known in the arts.

The database 404 is one known in the arts which is capable of indexing a plurality of records, storing records, receiving and interpreting a query, and retrieving one or more records in response to a query. It should be understood that a record, as used herein, comprises any software data structure capable of containing information which can be indexed, stored, searched, and retrieved by a database engine in response to a query. The database is also capable of adding new records and updating existing records already stored. Database construction, optimization, indexing, and record retrieval techniques are well known in the arts. Thus, a further discussion as to a specific database or a specific implementation thereof is omitted. One of ordinary skill would be able to readily acquire and setup a database in their own environments and use the database to store, index, and retrieve matching records based on an ordered sequence of alphanumeric codes and provide matching record(s) to the requesting process in response to that query.

Alternatively, the database resides on the print system device. Some or all of the functionality of the database may be integrated with the print system device. Some of the functionality of controllers responsible for configuring the print system to the device specific settings may reside on a computer system remotely located over a network.

Figure 5:
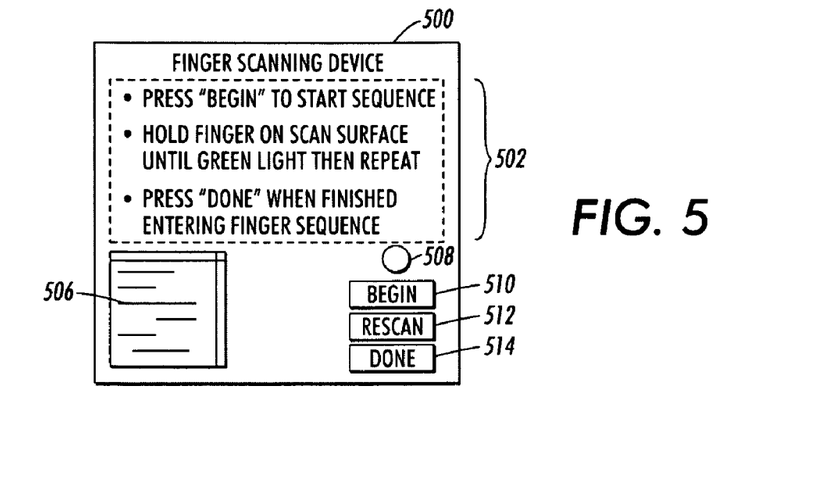
FIG. 5 illustrates one example embodiment of the fingerprint scanner 204 of system 200 of FIG. 2.

Reference is now being made to FIG. 5 illustrating one example embodiment of the fingerprint scanner shown at 204 of FIG. 2. Pressure-sensitive finger scanning device 500 is mounted on print system device 200 or integrated therewith and includes a label 502 for briefly instructing the user how to generally proceed. The finger scanning device includes a scan surface 506 whereon the user places the appropriate finger of the appropriate hand in preparation for scanning. Indicator light 508 provides a visual indication when the scan of an individual finger has completed. The scanning device further includes a plurality of buttons. In the example embodiment illustrated, these are a BEGIN button 510, a RESCAN button 512 and a DONE button 514. The fingerprint scanner is in digital communication with a special purpose computer (not shown) which, in one embodiment, is integrated with complex print system 200.

Figure 6:
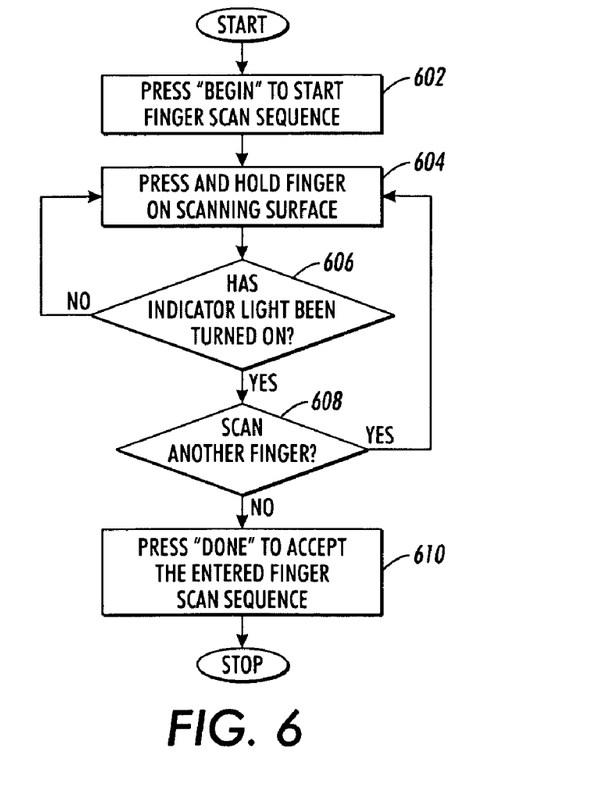
FIG. 6 illustrating one example embodiment of a flow diagram of the operation of fingerprint scanning device 500 of FIG. 5.

Reference is now being made to FIG. 6 illustrating one example embodiment of a flow diagram of the operation of fingerprint scanning device 500. The process starts by the user approaching the print system device 200 with a desired workflow process intending to be performed. It is assumed that the user has knowledge of the specific scan sequence which has already been preprogrammed by an operator and associated with the desired workflow. Alternatively, the user retrieves a default set of settings and customizes those, and then associate their own scan sequence with those setting by manually entering the desired scan sequence into sequence display line 324, as previously described, and storing that sequence with the data record containing the customized settings. A default set of customized settings can alternatively be retrieved from a CD-ROM or floppy disk, or over the network using workstation 210.

Operationally, the process begins at 602 wherein the user presses the BEGIN button 510 which initializes the fingerprint scanning device. Device initialization would include an internal reset being performed to clear previously stored data and prepare the device for a new scan operation. A time-out function would reset all of device 500 to an initial or default operating state in preparation of a new fingerprint scan sequence. At 604, the user then presses a first finger in the intended sequence on to scan surface 506. The pressing of the finger on the scan surface initiates a first scan of the fingerprint. The user holds their finger on the scan surface until, at 606, the indicator light 508 is activated (blinks). A multi-color light can be used. A green light would provide the indication that the fingerprint scanning device is ready to scan the next finger in the sequence. A red light would provide the indication that the scan failed for some reason and the finger rescanned. If an error condition in the first scan has not occurred, and the scan of that first finger in the sequence has completed successfully, at 608, the user decides if another finger is required to be scanned to achieve the desired scan order sequence. If the desired scan sequence requires, for example, a total of four finger scans, then the flow diagram proceeds back to step 604 and the user would press a second finger on the scan surface and hold that finger there until the indicator light again told the user that the second finger scanned successfully. This process repeats until, at 608, the user does not wish to scan another finger. At 610, the user presses the DONE button 514 to instruct the fingerprint scanning device that the desired scan sequence has been entered.

Once the scan has completed, the digitized signal is provided to the software routine which is used to identify a finger/hand combination as previously discussed. The appropriate alphanumeric codes are then assigned to the entered sequence and used to reference the associated stored record containing the set of settings which have been previously associated with that code sequence. In less sophisticated implementations, a lookup table is searched for a match on each of the scanned fingers in the sequence (the user already having each of their fingerprints previously registered) and the alphanumeric codes retrieved from the respective matching lookup table entries. The scanned fingerprints collectively provide an ordered sequence represented by an associated string of alphanumeric codes (of FIG. 1). If no matching records are found a user notification is provided. Such notification may include an alarm sound and/or a message displayed on the user interface at workstation 210. If a matching record containing the entered sequence of alphanumeric codes is located, the system then retrieves the matching record and displays the settings for the user. The user can accept the currently displayed settings. Alternatively, certain code sequences trigger the print system to automatically configure itself to the retrieved settings and begin the desired workflow process without user approval.

Figure 7:
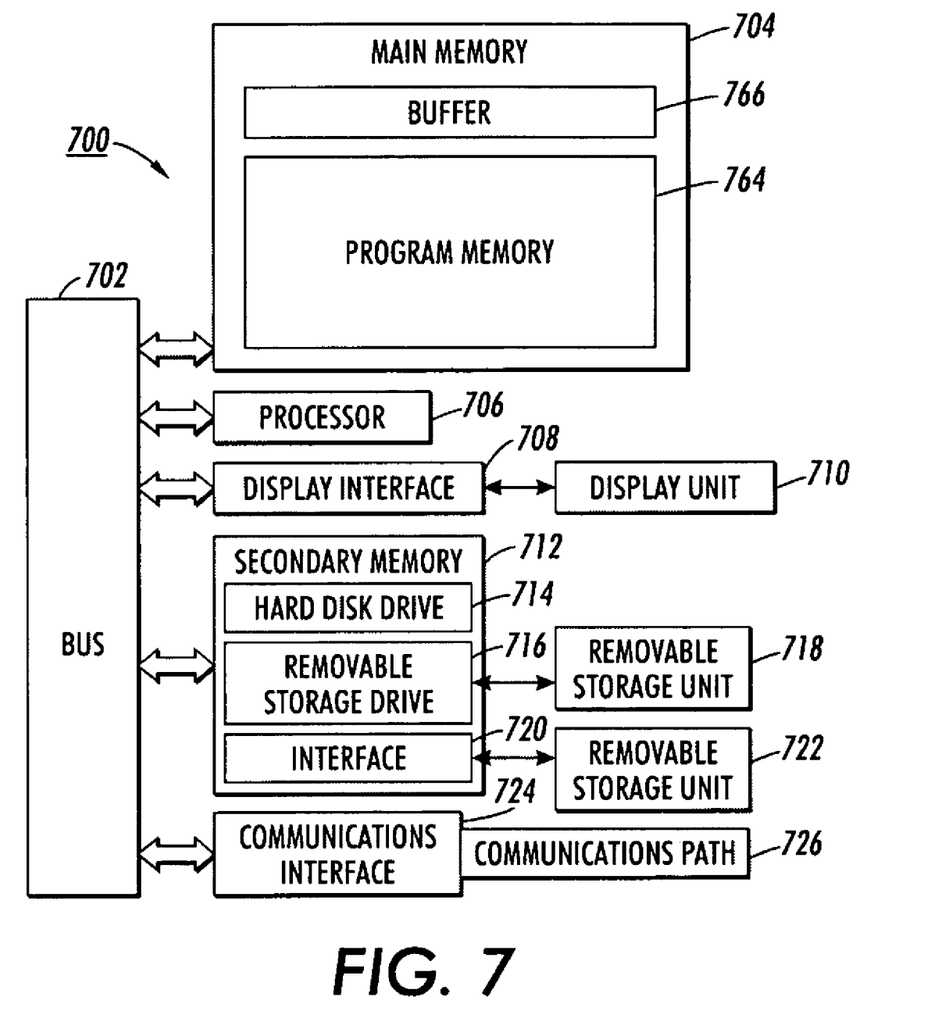
FIG. 7 illustrates on example embodiment of a special purpose computer integral to the document reproduction system of FIG. 2 for carrying out various embodiments of the present method.

Reference is now being made to FIG. 7 which illustrates on example embodiment of a special purpose computer capable of receiving the input signals of the fingerprint scanning device 204 and instructing various device controllers internal to document reproduction system 200 to configure a plurality of device subsystems to a set of device specific settings and perform the intended workflow processes. Such a computer system is integrated in to workstation 210 and specifically configured to perform various embodiments hereof.

The illustrated example special purpose computer 700 includes a processor 706 capable of executing machine executable program instructions. The process is in digital communication with bus 702. The system includes a main memory 704 to store machine readable instructions containing some or all of the present method to be executed by the processor. The main memory is capable of storing data and may include random access memory (RAM) to support reprogramming and flexible data storage. Main memory includes buffer 766 to store data and program memory 764 that includes, for example, executable programs. The program memory also stores data in the buffer. A display interface 708 forwards data from the communication bus to display 710. A secondary memory 712 stores computer programs which, when executed, perform the various embodiments provided herein. The secondary memory may include, for example, a hard disk drive 714 and a removable storage drive 716 which reads and writes to removable storage unit 718, such as a floppy disk, magnetic tape, optical disk, etc. The secondary memory may also include other mechanisms for allowing computer program instructions to be mounted into the computer system such as, for example, a removable storage device 722 adapted to exchange data through interface 720. Examples of other mechanisms include a program cartridge and cartridge interface, a memory chip (EPROM, or PROM) and other devices which allow software and data to be transferred to the special purpose computer system and to external devices.

The computer system includes a communications interface 724 which allows software and data to be transferred between the special purpose computer 700 and print system device 200. Examples of a communications interface include a modem, a network interface (such as an Ethernet card), a communications port, a PCMCIA slot and card, etc. Executable programs may also be received via the communications interface. Software, data, and computer programs transferred and/or received via the communications interface may be in the form of signals such as, for example, electronic, electromagnetic, optical, or any other signals capable of being received by communications interface. These signals are provided to the communications interface via a communications path (i.e., channel) 726 which carries such signals. The communications channel path may be implemented using wire, cable, fiber optic, phone line, cellular link, RF, or other communications channels.

Figure 8:
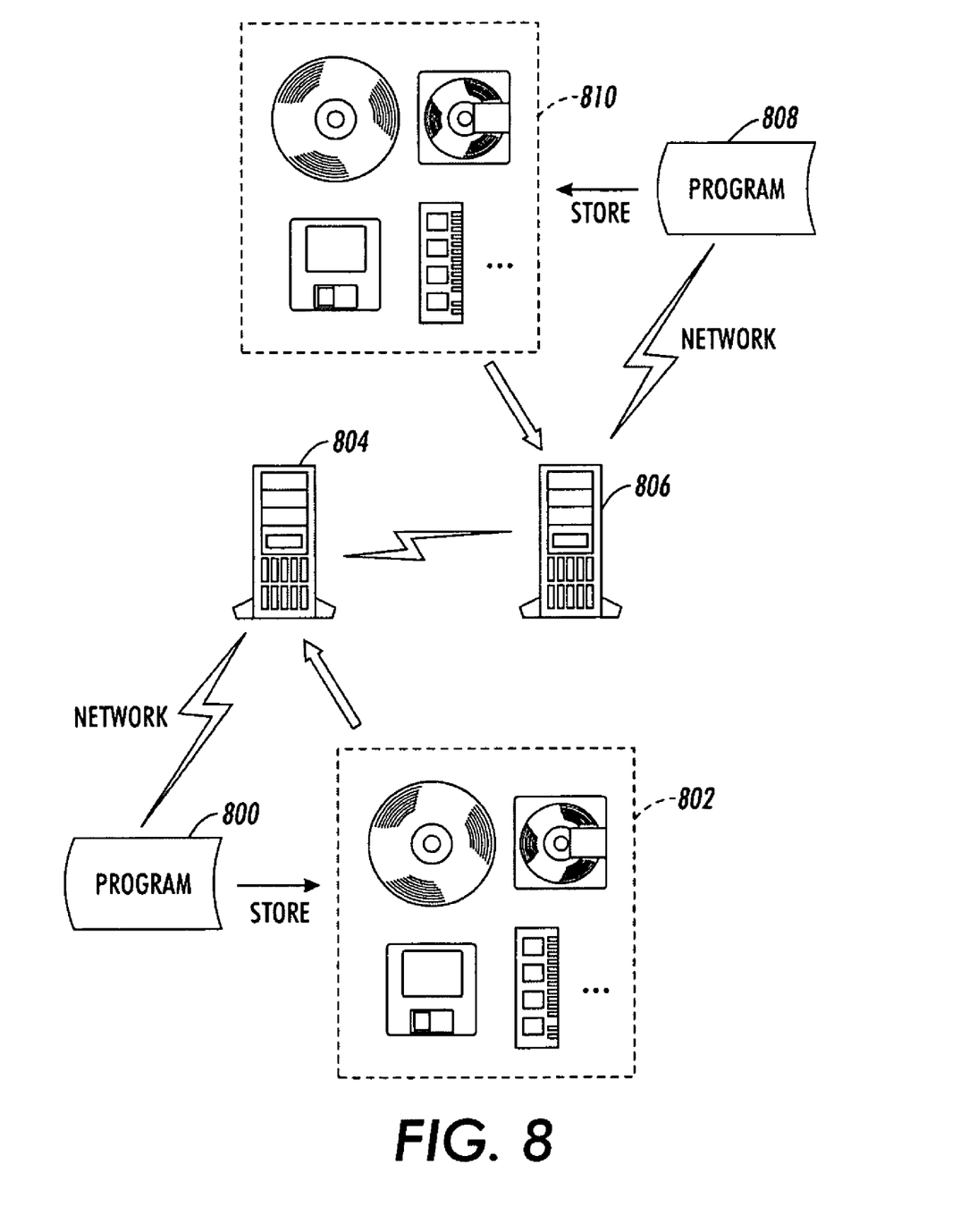
FIG. 8 is an explanatory diagram illustrating one example of a computer readable storage medium capable of storing machine readable instructions which, when mounted on a computer system, causes the system to perform one or more aspects of the present method.

Reference is now being made to FIG. 8 which is an explanatory diagram illustrating one example of a computer readable storage medium capable of storing machine readable instructions which, when mounted on a computer system, causes the system to perform one or more aspects of the present method as described above. The machine readable instructions may be modified by one computer and transferred to another computer.

In the illustrated embodiment, computer programs 800 for carrying out the present method are loaded on a computer readable storage media 802 which includes media such as optical disks (CD-ROM etc.), magnetic disks, magnetic cards, memories (including IC cards and memory card). The computer program product 800 stores the machine readable program instructions for sale and transport, by changing magnetic, optical, and/or electric energy states in response to program description instructions transferred to the media. The media can then be mounted on a scone computer system 804 and transferred or otherwise communicated to yet another computer system 806 via a network connection. The program instructions can then be off-loaded to another computer program product 808 in an original form or as modified, including data, and stored on media 810.

The term computer program product is intended to include any computer readable medium, computer executable medium, computer usable medium, or machine readable media capable of providing instructions and/or data to a computer system for implementing one or more aspects of the present method as described above. The computer program product is capable of storing data, instructions, messages packets, or other machine readable instructions, and includes non-volatile memory, such as a floppy disk, hard drive and volatile memory such as ROM, RAM, flash, and the like. It further includes a CD-ROM, DVD, tape, cassette, or other digital or analog media, capable of having embodied thereon one or more logical program instructions or machine executable codes or commands that implement and facilitate the function, capability, and methods disclosed herein. The computer program product may additionally contain information held in a transitory state such as a network link or a network interface which may include a wired network or a wireless network which allows a computer to read such computer readable information.

It should be understood that the flow diagrams, block diagrams, and drawings herewith are illustrative and not limiting. Variations thereof are intended to fall within the scope of the appended claims.

It should also be understood that one or more aspects of the present system and method are intended to be incorporated in an article of manufacture, which includes a computer program product. The article of manufacture may be included on at least one storage device readable by a machine architecture, xerographic device, photographic device, or color management system capable of executing program instructions. The article of manufacture may further be included as part of an operating system, a software program, a plug-in. The article of manufacture may be packaged, shipped, sold, leased, or otherwise provided separately either alone or as part of an add-on, update, upgrade, or product suite by the present assignee or a licensee thereof.

It will be appreciated that the above-disclosed features and functions and variations thereof may be desirably combined into many other different systems or applications. Various presently unforeseen or un-anticipated alternatives, modifications, variations, or improvements may become apparent and/or subsequently made by those skilled in the art which are also intended to be encompassed by the appended claims. The embodiments set forth above are considered to be illustrative and not limiting. Various changes to the above-described embodiments may be made without departing from the spirit and scope of the invention.

What is claimed is:

1. A method for configuring a print system device to a set of device specific settings, the method comprising:
uploading device specific settings and associated code sequences to a database in communication with a print system device having a multiple fingerprint scanning device to scan two or more finger combinations of a user's hand, said multiple fingerprint scanning device comprising a template configured from at least one of: a left hand template for individual left fingerprint scans tailored to a shape of said left hand, and a right hand template for individual right fingerprint scans tailored to a shape of said right hand, such that individual fingers can be identified by their placement in said template and a unique code can be associated with each finger;

scanning, using said multiple fingerprint scanning device, a plurality of individual fingerprints in a defined ordered sequence within said template;

building a code sequence from said defined ordered sequence of said scanned fingerprints;

using said code sequence to reference a specific set of print system device specific settings from said database, said device specific settings having been previously associated with said built code sequence;

retrieving said referenced set of device specific settings associated with said code sequence from a storage device; and configuring a print system device to said retrieved device specific settings.

2. The method of claim 1, further comprising:

displaying said retrieved device specific settings on a user interface of said print system device; and configuring said print system device in response to a user acceptance of said displayed device specific settings.

3. The method of claim 1, wherein in response to no device specific settings having been retrieved, further comprising:

displaying a set of default device specific settings;

receiving a code sequence from said user;

associating said entered code sequence with said displayed default device specific settings; and storing said received code sequence with said default device specific settings.

4. The method of claim 1, wherein said device specific settings comprise any of a system setting, a sub-system setting, a set of print media attributes and a workflow process.

5. A system for configuring a print system device to a set of device specific settings, the system comprising:

a multiple fingerprint scanner device for scanning two or more finger combinations of a user's hand, said multiple fingerprint scanner device comprising a template configured from at least one of: a left hand template for individual left fingerprint scans tailored to a shape of said left hand, and a right hand template for individual right fingerprint scans tailored to a shape of said right hand, such that individual fingers can be identified by their placement in said template and a unique code can be associated with each finger; and a processor in communication with said database and said multiple fingerprint scanner device, said processor executing machine readable instructions for performing:

scanning a plurality of individual fingerprints in a defined ordered sequence within said template of said multiple finger scanner device;

building a code sequence from said defined ordered sequence of scanned fingerprints;

using said code sequence to reference a set of device specific settings;

retrieving said set of device specific settings associated with said code sequence; and configuring a print system device to said retrieved device specific settings.

6. The system of claim 5, further comprising:

displaying said retrieved device specific settings on a user interface of said print system device; and configuring said print system device in response to a user acceptance of said displayed device specific settings.

7. The system of claim 5, wherein in response to no device specific settings having been retrieved, further comprising:

displaying a set of default device specific settings;

receiving a code sequence from said user;

associating said entered code sequence with said displayed default device specific settings; and storing said received code sequence with said default device specific settings.

8. The system of claim 5, wherein said device specific settings comprise any of a system setting, a sub-system setting, a set of print media attributes and a workflow process.

9. A computer program product for configuring a print system device to a set of device specific settings, the computer program product comprising:

a non-transitory computer readable medium for storing instructions that, when executed on a computer, cause the computer to perform:

uploading device specific settings and associated code sequences to a database in communication with a print system device having a multiple fingerprint scanning device to scan two or more finger combinations of a user's hand, said multiple fingerprint scanning device comprising a template configured from at least one of: a left hand template for individual left fingerprint scans tailored to a shape of said left hand, and a right hand template for individual right fingerprint scans tailored to a shape of said right hand, such that individual fingers can be identified by their placement in said template and a unique code can be associated with each finger;

scanning, using said multiple fingerprint scanning device, a plurality of individual fingerprints in a defined ordered sequence within said template;

building a code sequence from said defined ordered sequence of scanned fingerprints;

using said code sequence to reference a set of device specific settings from said database, said device specific settings having been previously associated with said built code sequence;

retrieving said set of device specific settings associated with said code sequence from a storage device; and configuring a print system device to said retrieved device specific settings.

10. The computer program product of claim 9, further comprising:

displaying said retrieved device specific settings on a user interface of said print system device; and configuring said print system device in response to a user acceptance of said displayed device specific settings.

11. The computer program product of claim 9, further comprising:

displaying said retrieved device specific settings on a user interface of said print system device; and configuring said print system device in response to a user acceptance of said displayed device specific settings.

12. The computer program product of claim 9, wherein in response to no device specific settings having been retrieved, further comprising:

displaying a set of default device specific settings;

receiving a code sequence from said user;

associating said entered code sequence with said displayed default device specific settings; and storing said received code sequence with said default device specific settings.

13. The computer program product of claim 9, wherein said device specific settings comprise any of: a system setting, a sub-system setting, a set of print media attributes, and a workflow process.

* * * * *